US007143396B2

(12) United States Patent
Suresh

(10) Patent No.: US 7,143,396 B2
(45) Date of Patent: Nov. 28, 2006

(54) SYSTEM AND METHOD FOR MEASURING CODE SEGMENT PERFORMANCE

(75) Inventor: Charles Suresh, Menlo Park, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 640 days.

(21) Appl. No.: 10/288,967

(22) Filed: Nov. 6, 2002

(65) Prior Publication Data

US 2004/0088699 A1    May 6, 2004

(51) Int. Cl.
*G06F 9/44* (2006.01)
(52) U.S. Cl. .................. 717/130; 717/131; 717/158; 714/37; 714/35
(58) Field of Classification Search .............. 717/130, 717/131, 158; 714/37, 35, 39
See application file for complete search history.

(56) References Cited

U.S. PATENT DOCUMENTS

| | | | | |
|---|---|---|---|---|
| 5,450,586 | A * | 9/1995 | Kuzara et al. ............. 717/124 |
| 5,748,878 | A * | 5/1998 | Rees et al. ................ 714/38 |
| 5,758,061 | A * | 5/1998 | Plum ........................ 714/35 |
| 5,940,618 | A * | 8/1999 | Blandy et al. ............ 717/128 |
| 5,960,198 | A * | 9/1999 | Roediger et al. ......... 717/130 |
| 6,079,032 | A * | 6/2000 | Peri .......................... 714/38 |
| 6,085,029 | A * | 7/2000 | Kolawa et al. ........... 714/38 |
| 6,161,200 | A * | 12/2000 | Rees et al. ................ 714/38 |
| 6,298,477 | B1 * | 10/2001 | Kessler ..................... 717/145 |
| 6,311,327 | B1 * | 10/2001 | O'Brien et al. ........... 717/114 |
| 6,341,357 | B1 * | 1/2002 | Ravichandran ........... 714/38 |
| 6,397,379 | B1 * | 5/2002 | Yates et al. ............... 717/140 |
| 6,397,382 | B1 * | 5/2002 | Dawson .................... 717/130 |
| 6,412,107 | B1 * | 6/2002 | Cyran et al. .............. 717/148 |
| 6,467,052 | B1 * | 10/2002 | Kaler et al. ............... 714/39 |
| 6,539,539 | B1 * | 3/2003 | Larsen et al. ............. 717/129 |
| 6,658,651 | B1 * | 12/2003 | O'Brien et al. ........... 717/127 |
| 6,721,941 | B1 * | 4/2004 | Morshed et al. .......... 717/127 |
| 6,728,955 | B1 * | 4/2004 | Berry et al. .............. 717/158 |
| 6,732,357 | B1 * | 5/2004 | Berry et al. .............. 717/158 |
| 6,918,110 | B1 * | 7/2005 | Hundt et al. .............. 717/158 |
| 6,968,547 | B1 * | 11/2005 | Cantrill .................... 717/158 |

OTHER PUBLICATIONS

IDebug: An Advanced Debugging Framework for JAVA, J. R. Kinry et al, Sep. 1998, pp. 1-11.*
A Dual Viewpoint Sotware Test Tool, M.A. Hennell et al, Mar. 1995, pp. 101-104.*
Automatic Insertion of Performance Instrumentation for Distributed Applications, Sarr Blumson et al, OSF, Feb. 7, 1995, pp. 3-23.*

(Continued)

*Primary Examiner*—Todd Ingberg
(74) *Attorney, Agent, or Firm*—Park, Vaughan & Fleming LLP

(57) ABSTRACT

A system and methods are provided for inserting probe points into an executing program, and measuring the time spent traversing code paths from one probe point to any other probe point or some other performance metric (e.g., instructions executed, cache misses, memory addresses accessed). One method is implemented by inserting N probes. Each probe has a corresponding function configured to: retrieve the identifier and timestamp of the previous probe executed, calculate the time spent traversing the path from the previous probe to the current probe, and update a matrix of N×N elements, wherein each element corresponds to a path from one probe to another probe. After completion of the program, this matrix is useful for identifying code paths that are bottlenecks and hence candidates for optimization.

40 Claims, 5 Drawing Sheets

OTHER PUBLICATIONS

Multiprocessor Performance Measurement Instrumentation, Alan Mink et al, National Institute of Standards and Technology, 1990, pp. 256-269.*

IBM Technical Disclosure Bulletin, vol. 34, No. 7B, Dec. 1991, pp. 259-261.*

Run-Time Monitoring of Real-Time Systems, Sarah E. Chodrow et al, 1991, IEEE, pp. 103-112.*

An Extensible Probe Architecture for Network Protocol Performance Measurement, ACM, G. Robert Malan, et al., Oct. 1998, pp. 215-227.*

Tamches, et al.: Using Dynamic Kernel Instrumentation for Kernel and Application Tuning. International Journal of High-Performance and Applications, 13/3. Mar. 1, 1999, pp. 1-12. Printed from http://www.cs.wisc.edu/~paradyn/papers/index.html.

Tamches, et al.: Fine-Grained Dynamic Instrumentation of Commodity Operating System Kernels. Third Symposium on Operating Systems Design and Implementation (OSDI), New Orleans, Feb. 1999. Printed from http://www.cs.wise.edu/~paradyn/papers/index.html.

* cited by examiner

TUPLE Array 400

SYSTEM AND METHOD FOR MEASURING CODE SEGMENT PERFORMANCE

BACKGROUND

This invention relates to the field of computer systems. More particularly, a system and methods are provided for monitoring and measuring resource usage bottlenecks while traversing or executing code segments.

Performance monitoring and analysis tools are indispensable for promoting the design of efficient software programs. These tools are particularly useful when designing programs for parallel computing systems, as programming for these systems is far more difficult than for sequential systems. A parallel program contains multiple threads of execution that interact with each other to cooperatively accomplish a common goal. Managing parallelism, communication and synchronization among threads is extremely complex and inevitably error prone.

Data collection is a critical problem when measuring the performance of a parallel program. In particular, to measure the performance of a parallel program, it is necessary to collect data for full-sized data sets running on a large number of processors. However, collecting large amounts of data can significantly slow a program's execution and distort the collected data.

A variety of different approaches have been tried to enhance the efficiency with which performance data are collected. Two common approaches are event tracing and statistical sampling. However, both of these techniques have limitations—either in the volume of data they gather or the granularity of data collected. Event tracing, for example, can collect detailed information about interesting events during a program's execution. However, the events generate vast amounts of data that are difficult to manage. Statistical sampling greatly reduces the volume of performance data collected by summarizing interesting information as counts and times that are reported at the end of program execution. Summary data, however, loses important temporal information about usage patterns and relationships between different components.

Dynamic instrumentation is a new approach to data collection that overcomes the limits of tracing and sampling by allowing dynamic insertion and alteration of instrumentation code during program execution. The instrumentation allows measurement of just the performance data that are of interest to a particular user. By targeting just the necessary or requested data, dynamic instrumentation can greatly reduce the amount of information collected without losing the details available with event tracing, and thereby allow users to manage large, long running applications on large-scale parallel computers.

However, current implementations of dynamic instrumentation are limited in their ability to identify all bottlenecks that may occur within large, complex programs. For example, the standard method is to separate a program into a number of segments, and then insert instrumentation code at the beginning and end of each segment. This method cannot indicate whether a particular segment is a bottleneck or indicate the amount of resources used by that segment in comparison to other resource consumers.

Therefore, what is needed is a system and method for measuring performance or resource usage of segments of a computer program in order to identify choke points or bottlenecks in the program, wherein later measurements may be fine-tuned based on earlier measurements.

SUMMARY

In one embodiment of the invention, a system and methods are provided for inserting probe points in an executing program and measuring the time spent traversing the code path from any one probe point to any other probe point. In this embodiment, N probes are inserted into an executing program. Each probe has a corresponding function that: 1) retrieves the identifier and timestamp of the previous probe point executed, 2) calculates the time spent traversing the path from the previous probe to the current probe, and 3) updates a matrix of N×N elements, wherein each element corresponds to a path from one probe to another probe. After completion of the program, this matrix is used to identify code paths that are bottlenecks and hence candidates for optimization or additional instrumentation.

In other embodiments of the invention, other resource usage or performance metrics may be measured. For example, instead of measuring time, things such as instructions executed, cache misses, the number of times memory addresses are accessed, TLB (Translation Lookaside Buffer) invalidations, and so on, may be measured.

DETAILED DESCRIPTION

Figure 1:
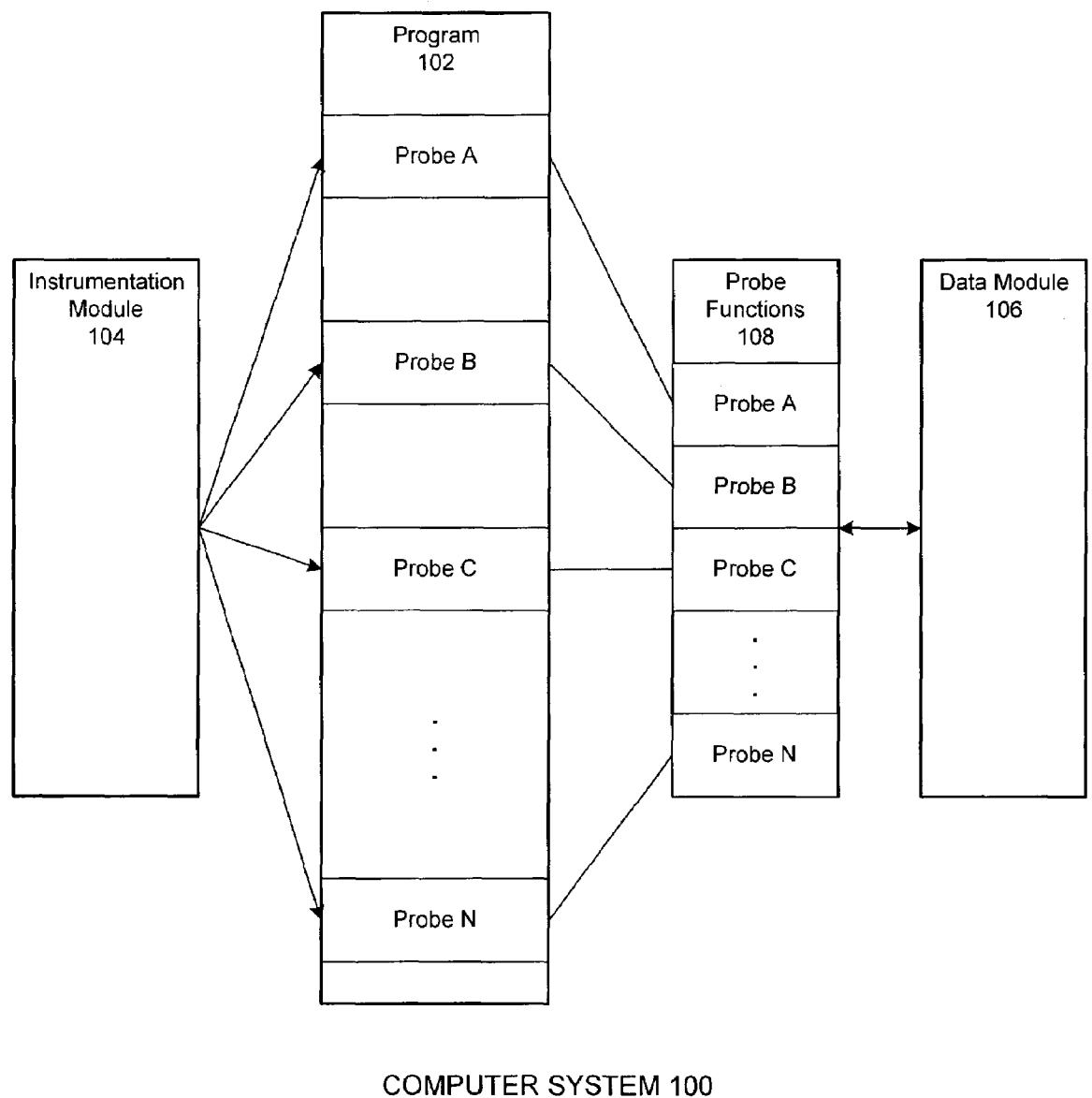
FIG. 1 is a block diagram depicting the insertion of path probes on software running on a computer system.

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

The program environment in which a present embodiment of the invention is executed illustratively incorporates a general-purpose computer or a special purpose device such as a hand-held computer. Details of such devices (e.g., processor, memory, data storage, display) may be omitted for the sake of clarity.

It should also be understood that the techniques of the present invention may be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a suitable computer-readable medium. Suitable computer-readable media may include volatile (e.g., RAM) and/or non-volatile (e.g., ROM, disk) memory, carrier waves and transmission media (e.g., copper wire, coaxial cable, fiber optic media). Exemplary carrier waves may take the form of electrical, electromagnetic or optical signals conveying digital data streams along a local network, a publicly accessible network such as the Internet or some other communication link.

In one embodiment of the invention, a system and methods are provided for measuring the time spent executing a portion of a computer program. In this embodiment, instrumentation code is inserted within program code statically and/or dynamically. The instrumentation code generates timestamps, and the difference between timestamps indicates the amount of time needed to traverse corresponding code blocks.

In one implementation of this embodiment, instrumentation code may be inserted in a program before and after an arbitrary portion of program code. When the instrumentation code is executed (along with the code block), corresponding timestamps are generated. The difference in time indicated by the two timestamps reveals the amount of time needed to traverse the code block. By gathering these time differences for a significant period, inefficient or slow blocks of code can be identified.

In other embodiments of the invention, other performance metrics regarding execution of a code block may be measured. Such metrics may include cache misses, TLB (Translation Lookaside Buffer) invalidations, the number of instructions executed or the number of memory addresses accessed, etc. Such information may then be compared to observations made for other code blocks or other consumers of system resources (e.g., communication devices, storage devices).

FIG. 1 depicts a computer system in which an illustrative embodiment of the invention may be implemented. In this embodiment, computer system 100 includes program 102, instrumentation module 104, data module 106 and probe functions 108. During execution of program 102, instrumentation module 104 inserts two or more probes into the program (e.g., probes A, B, . . . N). A location at which a probe is inserted may be considered a probe point.

A path through the program from one probe to another may be identified by the corresponding probes. Thus, the path AN indicates a path from probe A to probe N, path BA indicates a path from probe B to probe A, path CC refers to a path from probe C back to itself, etc.

When executed, a probe calls a corresponding probe function 108, which comprises a series of computer executable instructions for retrieving information from data module 106 if necessary, observing performance metrics, generating any specified information and updating the data module. In one or more embodiments of the invention described herein, "execution of a probe" and "execution of a probe function" corresponding to the probe may be used interchangeably.

In an embodiment of the invention, probes may be initially inserted at arbitrary locations to segregate specific sections of code that contain performance bottlenecks or that are suspected of containing bottlenecks. Additional probes may then be introduced with finer granularity into poorly performing sections to identify the problems. For example, several processes in an application may be organized as a ring with a token message passed around the ring. By placing probes at strategic locations in each process, the programmer can identify which operations, either contained within a process or spread among multiple processes, consume the most time. Data gathered by implementing an embodiment of the invention can then be used to optimize those operations.

Figure 2:
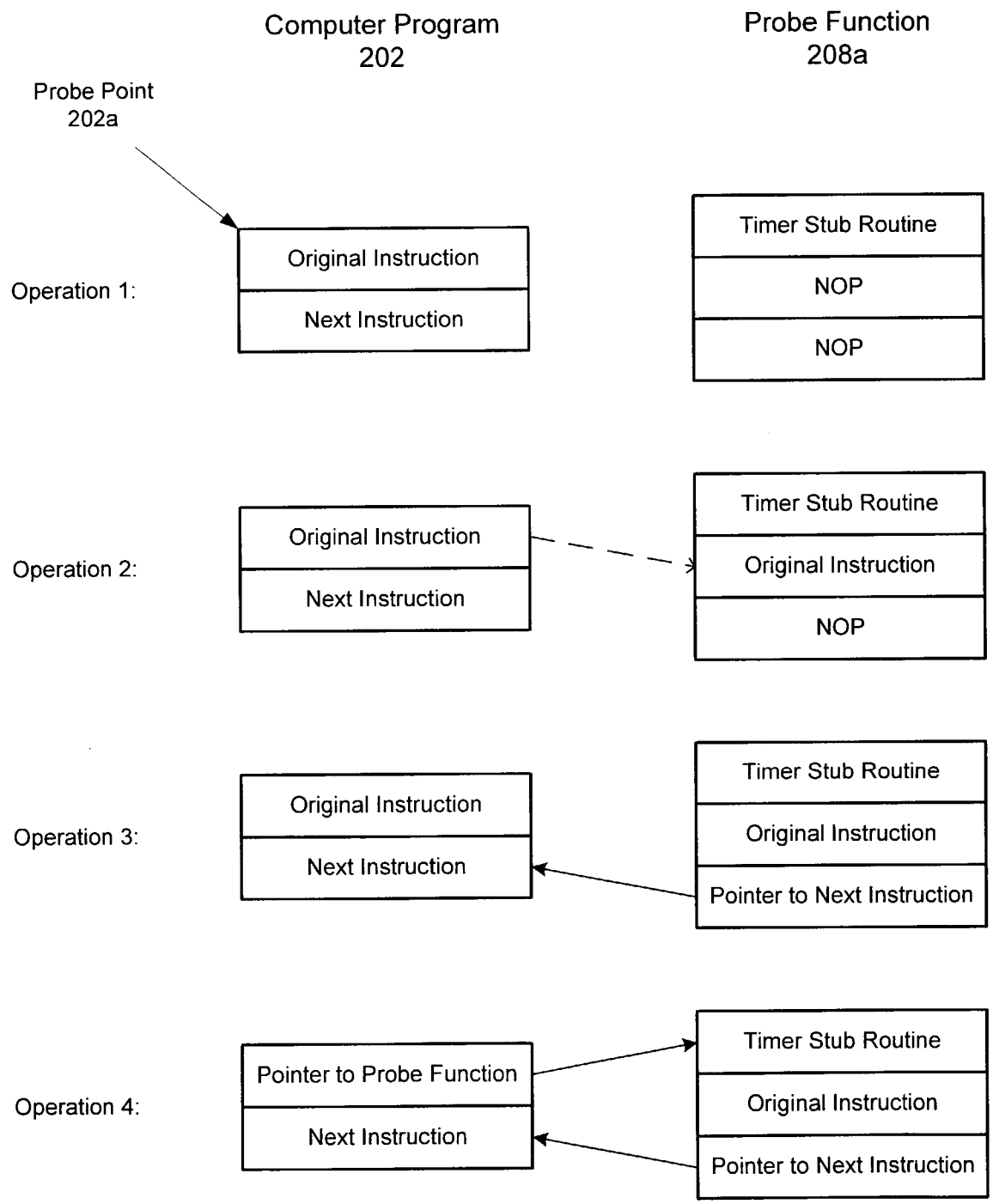
FIG. 2 is a flow chart illustrating one method of patching a running software program in accordance with an embodiment of the invention.

FIG. 2 depicts a method by which an instrumentation module (e.g., instrumentation module 104 of FIG. 1) inserts a probe into an executing program, according to one embodiment of the invention. In operation 1, a location in computer program 202 corresponding to a machine-level instruction is identified as a probe point 202a. A corresponding probe or probe function 208a is created, which initially consists of a timer stub routine that maintains counters and accumulators for tracking desired information. In operation 2, the original instruction at probe point 202a is copied to the probe function. In operation 3, a pointer to the next instruction in the program is added to the probe function. In operation 4, the original instruction is replaced with a pointer or instruction redirecting execution to the beginning of probe function 208a.

Figure 3:
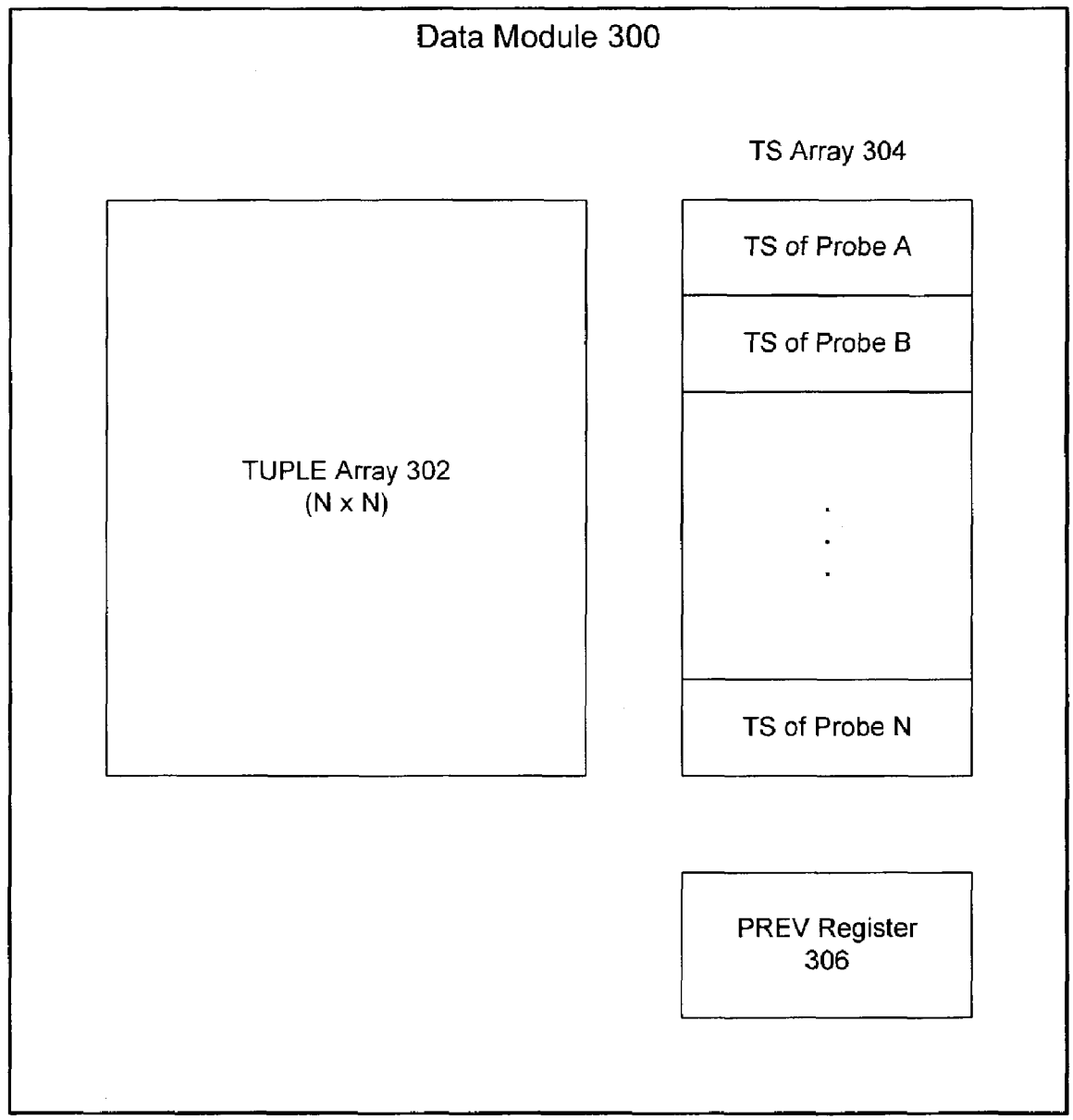
FIG. 3 is a block diagram depicting a data module containing information for N probes, according to one embodiment of the invention.

FIG. 3 depicts a data module for storing data collected during instrumentation of a program, according to one embodiment of the invention. Data module 300 includes TUPLE array 302, TS array 304 and PREV register 306. In this embodiment, performance of a segment of the program is measured, at least in part, by the amount of time needed to traverse the segment. Therefore, the data module is configured to store time-related information.

In this embodiment, TS array 304 is a single dimension array of N entries, wherein each entry corresponds to a different probe inserted in the program and contains the timestamp of when that probe was last executed. Each time a probe is executed, the corresponding entry in TS array 304 is updated.

PREV register or identifier 306 identifies the probe last executed. In the illustrated embodiment of the invention, a probe may be uniquely identified by the program counter at which it is located. In other embodiments, probes may be identified with labels or by other means.

TUPLE array 302 is an N×N array of elements corresponding to every possible pairing of instrumentation probes within the program. In this embodiment, an element [I, J] comprises two values: the total accumulated amount of time spent traversing the program from probe I to probe J, and the number of times a path between those probes has been traversed. Thus, each element of TUPLE array 302 may be represented as a tuple in the form <time, count>.

For example, if only 2 probes, A and B, are inserted in a program, the corresponding TUPLE array 302 would be a 2×2 structure containing elements for all combinations of probe paths—AA, AB, BA, BB.

In a computer system with multiple processors or central processing units (CPU), each TS array entry, PREV register and TUPLE array element may also contain an identifier of the processor that executed the corresponding probe(s). Alternatively, a separate TS array, PREV register and TUPLE array may be maintained for each CPU.

Figure 4:
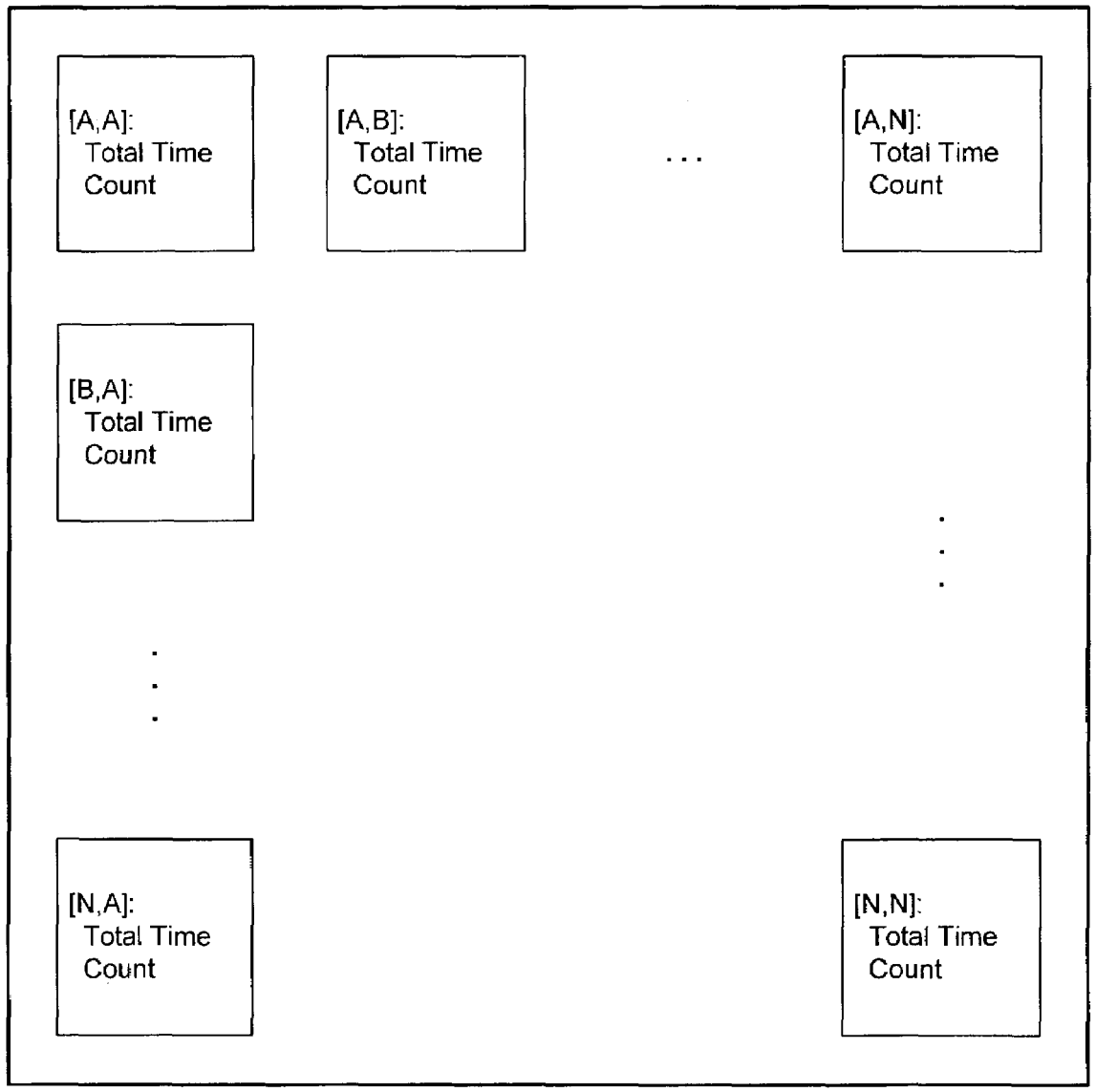
FIG. 4 is a block diagram depicting an N×N matrix of elements, each element corresponding to a path from one probe to another probe, according to one embodiment of the invention.

FIG. 4 depicts a TUPLE array for N probes, numbered A, B, . . . N, according to one embodiment of the invention. Each element of TUPLE array 400 contains parameters relating to the corresponding probes, such as the total time spent traversing a path between the probes and a count of the times the path was traversed during program execution. In other embodiments of the invention, additional or different data may be stored in an element of a TUPLE array.

The following pseudo code depicts a series of instructions for implementing a probe function (e.g., probe function 108 of FIG. 1) in a computer system, according to one embodiment of the invention in which the measured resource is time. In this embodiment, each probe is identified by the program counter (PC) at which the probe is located.

```
Probe Function (PC) {
    previous_time = TS [PREV]
    current_time = get current_time( )
    difference = current_time – previous_time
    TS [PC] current_time
    Increment (TUPLE [PREV,PC].total_time, difference)
    Increment (TUPLE [PREV,PC].count, 1)
    PREV = PC
}
```

For demonstration purposes, it may be assumed that, during program execution, Probe C is encountered, followed by Probe A. When Probe A is executed, it calls the probe function with Probe A's program counter (PC) value. The timestamp of the last probe executed, Probe C, is retrieved from the TS array. The current time is generated, typically from the computer system's internal clock. The time difference between the current time and previous time determines the time that was required to traverse the program from the code point identified by Probe C to the code point identified by Probe A. The TS array is updated for Probe A with the current time. In this instance, TUPLE array element [C,A] is updated. An accumulator tracks the total time spent by the program traversing a probe path from C to A. Another accumulator tracks the number of times path(s) from C to A is/are traversed.

The previous example assumes a configuration with a single CPU. The following pseudo code depicts a series of instructions for implementing a probe function in a computer system with multiple processors, according to one embodiment of the invention.

```
Probe Function (PC) {
    CPU = get_current_cpu( )
    previous_time = TS [CPU,PREV [CPU]]
    current_time = get_current_time( )
    difference = current_time – previous_time
    TS [CPU,PC] = current_time
    Increment (TUPLE [CPU,PREV[CPU],PC].total_time, difference)
    Increment (TUPLE [CPU,PREV[CPU],PC].count, 1)
    PREV [CPU] = PC
}
```

For demonstration purposes, it may assumed that Probe C is encountered first, followed by Probe A, both executed on the same processor. Note that in a multiple CPU configuration, there may be a separate data module (e.g., similar to data module 300 of FIG. 3) for each CPU, including separate TUPLE arrays, TS arrays and PREV registers. Therefore, all information retrieval and updates performed when Probe A is executed are to the TUPLE array, TS array or PREV register corresponding to the CPU executing Probe A.

When Probe A is executed, it calls the probe function with Probe A's program counter (PC) value. The identification of the CPU executing Probe A is first generated. The timestamp of the last probe, Probe C, is retrieved from the TS array. The current time is generated. The time difference between the current time and previous time yields the time required to traverse the program from the code point identified by Probe C to the code point identified by Probe A. The TS array is updated for Probe A with the current time. In this instance, TUPLE array element [C,A] is updated. An accumulator tracks the total time spent by the program traversing a probe path from C to A. Another accumulator tracks the number of times the path is traversed.

After completion of the program, the TUPLE array contains detailed information regarding the time spent traversing the program between any two probe locations. This table can therefore be used to identify code paths that are bottlenecks and hence need improvement. For example, a particular path may be relatively slow but may be traversed only once. A better candidate for improvement may be another path that is relatively fast but which is traversed hundreds or thousands of times.

Figure 5:
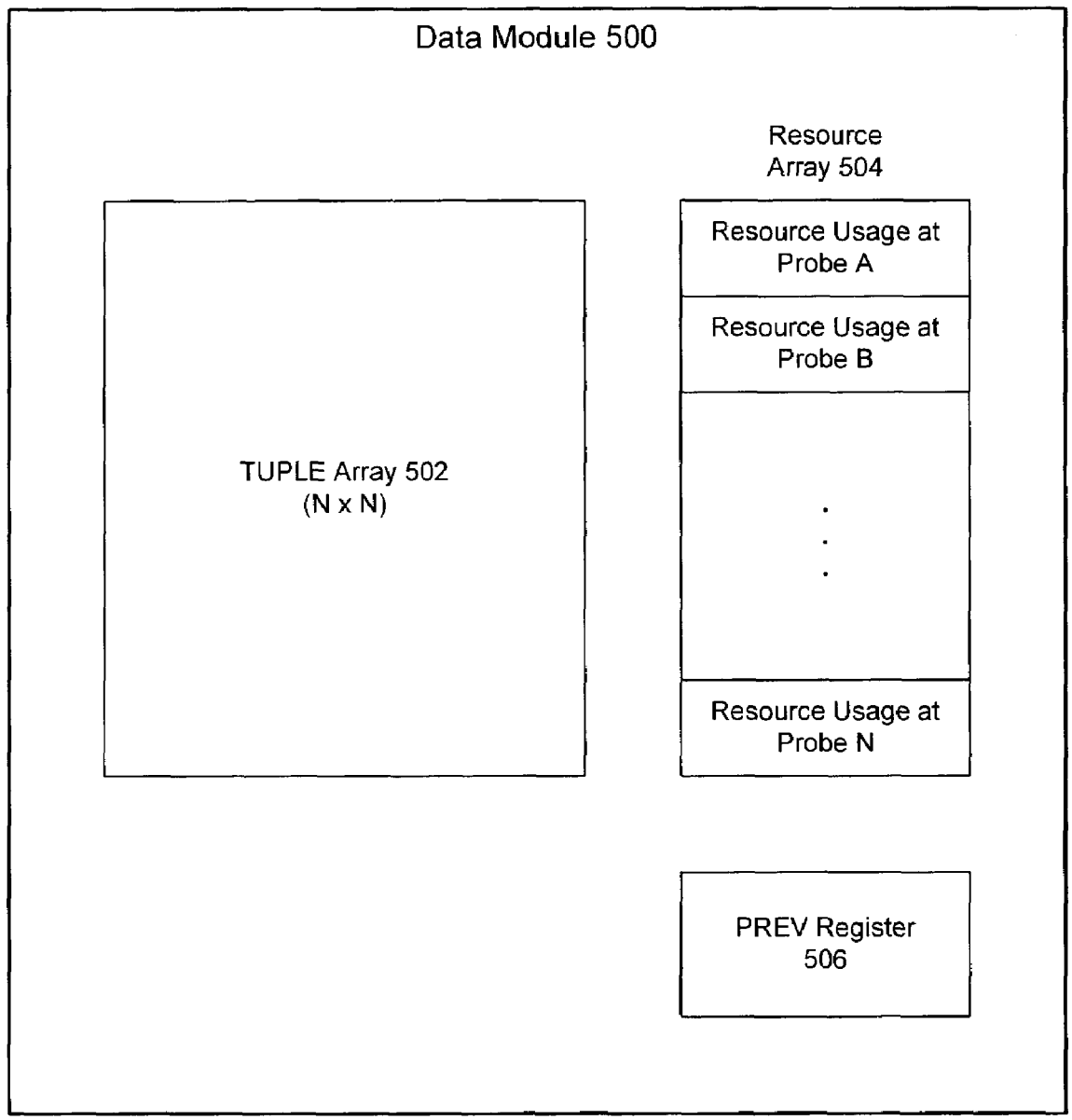
FIG. 5 is a block diagram depicting a data module containing information for N probes, according to one alternative embodiment of the invention.

FIG. 5 demonstrates a data module configured for use in an alternative embodiment of the invention, in which a resource metric other than time is measured.

Data module 500 of FIG. 5 includes TUPLE array 502, Resource array 504 and PREV register 506. In this embodiment, Resource array 504 stores a resource usage or performance metric observed at each probe (e.g., cache misses, instructions executed). PREV register 506 identifies the previous probe that was executed.

TUPLE array 502 is configured similarly to TUPLE array 302 of FIG. 3, but stores resource information other than time. Thus, if cache misses are being measured in this embodiment, an element [I,J] of TUPLE array 502 may store the total number of cache misses experienced while traversing a code path from Probe I to Probe J, and the total number of times the code path was traversed. Thus, in this embodiment, an element of TUPLE array 302 may be represented as a tuple in the form <cache misses, count>.

In this alternative embodiment of the invention, in which a performance metric or resource other than time is measured, the following pseudo code describes how the metric resource usage may be tracked.

```
Probe Function (PC) {
    previous_resource_usage Resource [PREV]
    current_resource_usage = get_current_resource_usage(resource)
    difference = current_resource_usage – previous_resource_usage
    Resource [PC] = current_resource_usage
    Increment (TUPLE [PREV,PC].total_resource_usage, difference)
    Increment (TUPLE [PREV,PC].count, 1)
    PREV = PC
}
```

In this illustrative pseudo code, current usage of a tracked resource or a current measurement of a performance metric may be obtained from a processor (e.g., one of its performance counters). Such performance counters may track the number of instructions executed on the processor, the number of cycles used, the number of cache references, hits or misses, etc. Measurements of other performance metrics, such as virtual memory to physical memory translations, TLB invalidations (e.g., invalidating virtual memory and mapping it to physical memory), and so on, may be obtained elsewhere, such as from an operating system, a dedicated memory management unit, etc.

The foregoing embodiments of the invention have been presented for purposes of illustration and description only. They are not intended to be exhaustive or to limit the invention to the forms disclosed. Accordingly, the scope of the invention is defined by the appended claims, not the preceding disclosure.

What is claimed is:

1. A method of monitoring performance of a program executing in a computer, comprising:
installing a uniquely identifiable probe at each of N probe points (N≧2) by:
copying an original instruction at the probe point to a corresponding probe function;
modifying the original instruction path to branch to said probe function prior to the original instruction; and
configuring said probe function to return to the original instruction path; and
during execution of a first probe function corresponding to a first probe point:
updating a first timestamp associated with the first probe point with a current timestamp; and
for each of N-1 other probe points:
retrieving another timestamp associated with another probe point that preceded the first probe point during execution of the program; and
updating a probe path matrix on a computer readable medium to reflect the time difference between said current timestamp and said retrieved timestamp.

2. The method of claim 1, further comprising:
maintaining a timestamp array comprising an element for each of said N probe points;
wherein each element of said timestamp array is configured to store a timestamp of the most recent execution of the probe function corresponding to the associated probe point.

3. The method of claim 2, wherein said updating a first timestamp comprises:
storing said current time stamp in an element of said timestamp array associated with the first probe point.

4. The method of claim 2, wherein said retrieving another timestamp comprises:
retrieving said other timestamp from an element of said timestamp array associated with the other probe point.

5. The method of claim 2, wherein:
the computer comprises multiple processors; and
each element of said timestamp array is further configured to identify the processor on which the probe function corresponding to the associated probe point was most recently executed.

6. The method of claim 1, further comprising:
initializing said probe path matrix for N×N elements, wherein each element corresponds to a path from one probe point to another probe point, and is configured to store:
a total number of times said path is traversed during said execution of the program; and
a cumulative time spent traversing the path said total number of times.

7. The method of claim 6, wherein said updating a probe path matrix comprises:
identifying an element of said probe path matrix corresponding to the path from said other probe point to said first probe point; and
within said identified element:
incrementing said total number of times said path from said other probe point to said first probe point has been traversed; and
increasing said cumulative time spent traversing said path from said other probe point to said first probe point by said time difference.

8. The method of claim 1, further comprising:
configuring an identifier for identifying a probe point corresponding to the most recently executed probe function.

9. A computer readable storage medium storing instructions that, when executed by a computer, cause the computer to perform a method of monitoring performance of a program executing in a computer, the method comprising:
installing a uniquely identifiable probe at each of N probe points (N≧2) by:
copying an original instruction at the probe point to a corresponding probe function;
modifying the original instruction path to branch to said probe function prior to the original instruction; and
configuring said probe function to return to the original instruction path; and
during execution of a first probe function corresponding to a first probe point:
updating a first timestamp associated with the first probe point with a current timestamp; and
for each of N-1 other probe points:
retrieving another timestamp associated with another probe point that preceded the first probe point during execution of the program; and
updating a probe path matrix on a computer readable medium to reflect the time difference between said current timestamp and said retrieved timestamp.

10. A method of monitoring performance of a program executing in a computer system, comprising:
installing a uniquely identifiable probe at each of N probe points (N≧2) by:
copying an original instruction at the probe point to a corresponding probe function;
modifying the original instruction path to branch to said probe function prior to the original instruction; and
configuring said probe function to return to the original instruction path; and
during execution of a first probe function corresponding to a first probe point:
obtaining a measurement of a predetermined performance metric of the computer system;
updating a first performance metric measurement associated with the first probe point; and
for each of the N-1 other probe points:
retrieving another performance metric measurement associated with another probe point executed before the first probe point; and
updating a matrix on a computer readable medium to reflect a difference between said first performance metric and said other performance metric.

11. The method of claim 10, further comprising:
maintaining a resource array comprising an element for each of said N probe points;
wherein each element of said resource array is configured to store a performance metric measurement obtained during the most recent execution of the probe function corresponding to the associated probe point.

12. The method of claim 10, further comprising:
initializing said probe path matrix for N×N elements, wherein each element corresponds to a path from one probe point to another probe point, and is configured to store:
a total number of times said path is traversed during said execution of the program; and
the accumulated difference between measurements of the performance metric at the one probe point and the other probe point during said total number of times said path is traversed.

13. The method of claim 12, wherein said updating a matrix comprises:
 identifying an element of said matrix corresponding to the path from said other probe point to said first probe point; and
 within said identified element:
  incrementing said total number of times said path from said other probe point to said first probe point has been traversed; and
  increasing said accumulated difference by said difference between said first performance metric and said other performance metric.

14. The computer system of claim 10, wherein said performance metric comprises a number of instructions executed.

15. The computer system of claim 10, wherein said performance metric comprises a number of cache misses.

16. The computer system of claim 10, wherein said performance metric comprises a number of memory addresses accessed.

17. The computer system of claim 10, wherein said performance metric comprises a number of Translation Lookaside Buffer invalidations.

18. The computer system of claim 10, wherein said performance metric comprises time.

19. A computer readable storage medium storing instructions that, when executed by a computer, cause the computer to perform a method of monitoring performance of a program executing in a computer system, the method comprising:
 installing a uniquely identifiable probe at each of N probe points (N≧2) by:
  copying an original instruction at the probe point to a corresponding probe function;
  modifying the original instruction path to branch to said probe function prior to the original instruction; and
  configuring said probe function to return to the original instruction path; and
 during execution of a first probe function corresponding to a first probe point:
  obtaining a measurement of a predetermined performance metric of the computer system;
  updating a first performance metric measurement associated with the first probe point; and
  for each of the N-1 other probe points:
   retrieving another performance metric measurement associated with another probe point executed before the first probe point; and
   updating a matrix on a computer readable medium to reflect a difference between said first performance metric and said other performance metric.

20. A computer readable storage medium containing a data structure configured for facilitating the measurement of an amount of time spent traversing a path of execution of a computer program, the data structure comprising:
 an array configured to store N timestamps, wherein each said timestamp reflects a most recent time of execution of a corresponding one of N probes inserted into the computer program;
 an identifier configured to identify which of said N probes was executed most recently; and
 an N×N array of path elements, wherein each said path element corresponds to a path from a first of said N probes to a second of said N probes and comprises:
  a number of times said path has been traversed; and
  the total amount of time spent traversing said path during said number of times;
 wherein said N×N array of path elements is updated each time one of said N probes is executed.

21. A computer readable storage medium containing a data structure configured to facilitate the measurement of the performance of a portion of a computer program, the data structure comprising:
 an array configured to store N measurements of a predetermined performance metric, wherein each said measurement reflects a measure of the performance metric at the time of execution of a corresponding one of N probes inserted into the computer program;
 an identifier configured to identify which of said N probes was executed most recently; and
 an N×N array of path elements, wherein each said path element corresponds to a path from a first of said N probes to a second of said N probes and comprises:
  a number of times said path has been traversed; and
  the accumulated differences between said performance metric measurement at the time of execution of the first probe and said performance metric measurement at the time of execution of the second probe;
 wherein said N×N array of path elements is updated each time one of said N probes is executed.

22. A computer system for measuring the time spent traversing a portion of a computer program, comprising:
 a computer program comprising a series of processor executable instructions;
 an instrumentation module configured to insert N probes (N>2) into the computer program;
 a processor configured to execute the computer program and said N probes;
 for each of said N probes, a corresponding probe function configured to generate a timestamp at which said probe is executed; and
 a data module tangibly embodied on a computer readable medium and configured to store:
  said timestamps of said probe executions;
  an identifier of the last probe executed; and
  for each pair of probes within said N probes, the number of times a program path between said pair of probes has been traversed and the accumulated amount of time spent traversing the program path;
 wherein said data module is updated each time one of said N probes is executed.

23. The computer system of claim 22, wherein said data module includes a timestamp array configured to store said timestamps of said probe executions.

24. The computer system of claim 22, wherein said timestamp reflects the most recent execution of the corresponding probe function.

25. The computer system of claim 22, wherein said data module includes a probe path matrix configured to store said number of times the program path has been traversed and said accumulated amount of time spent traversing the program path.

26. The computer system of claim 25, wherein said probe function is further configured to update the probe path matrix by:
 incrementing said number of times the program path has been traversed; and
 increasing said accumulated amount of time spent traversing the program path.

27. The computer system of claim 26, wherein said probe function increases said accumulated amount of time by:
 retrieving a timestamp of the last probe executed;
 calculating the difference between the generated timestamp and the retrieved timestamp; and adding said difference to said accumulated amount of time spent traversing the program path.

28. The computer system of claim 22, further comprising:
one or more processors in addition to the processor; and
a corresponding data module for each of said one or more processors;
wherein each of said one or more processors is configured to execute the computer program and said two or more probes.

29. The computer system of claim 28, wherein said corresponding data module further comprises:
an identifier of the processor on which a probe is executed.

30. The computer system of claim 22, wherein said instrumentation module is further configured to dynamically enable one or more of said N probes.

31. The computer system of claim 22, wherein said instrumentation module is further configured to dynamically disable one or more of said N probes.

32. The computer system of claim 22, wherein said instrumentation module is further configured to dynamically remove one or more of said N probes.

33. A computer system for measuring resource usage of a computer program, comprising:
a computer program comprising a series of processor executable instructions;
an instrumentation module configured to insert N probes (N>2) into the computer program;
a processor configured to execute the computer program and said N probes;
for each of said N probes, a corresponding probe function configured to obtain a measurement of a performance metric of the computer system at the time said probe is executed; and
a data module tangibly embodied on a computer readable medium and configured to store:
said measurements of said performance metrics;
an identifier of the last probe executed; and
for each pair of probes within said N probes:
the number of times a program path between said pair of probes has been traversed; and
the accumulated differences between said performance metric measurements of said pair of probes during the number of times a program path between said pair of probes was traversed;
wherein said data module is updated each time one of said N probes is executed.

34. The computer system of claim 33, wherein said data module includes a resource array configured to store said performance metric measurements.

35. The computer system of claim 34, wherein said probe function is further configured to update the data module by:
incrementing said number of times the program path has been traversed;
determining a difference between a measurement of the performance metric when a first probe in said pair of probes is executed and a measurement of the performance metric when the second probe in said pair of probes is executed; and
increasing said accumulated differences by said difference.

36. The computer system of claim 33, wherein said performance metric comprises a number of instructions executed.

37. The computer system of claim 33, wherein said performance metric comprises a number of cache misses.

38. The computer system of claim 33, wherein said performance metric comprises a number of memory addresses executed.

39. The computer system of claim 33, wherein said performance metric comprises a number of Translation Lookaside Buffer invalidations.

40. The computer system of claim 33, wherein said performance metric comprises time.

* * * * *